March 1, 1966 W. J. WILLIS 3,238,298

MULTIPLEX COMMUNICATION SYSTEM WITH MULTILINE DIGITAL BUFFER

Filed May 7, 1962

7 Sheets-Sheet 1

*INVENTOR.*
WILLIAM JOHN WILLIS
BY Alden D. Redfield
Charles M. Hogan.
ATTORNEYS.

INVENTOR.
WILLIAM JOHN WILLIS
BY Alden D. Redfield
Charles M. Hogan.
ATTORNEYS.

March 1, 1966 W. J. WILLIS 3,238,298

MULTIPLEX COMMUNICATION SYSTEM WITH MULTILINE DIGITAL BUFFER

Filed May 7, 1962 7 Sheets-Sheet 3

INVENTOR.
WILLIAM JOHN WILLIS
BY Alden D. Redfield
Charles M. Hogan
ATTORNEYS.

| ORDER OF SAMPLES IN GROUP | DELAY WHICH IS APPLIED TO SAMPLE | DELAY LINES IN OPERATION | | | | | | SEQUENCE OF OPERATION OF GATES | | |
|---|---|---|---|---|---|---|---|---|---|---|
| | | 43 | 44 | 45 | 46 | 47 | 48 | | | |
| FIRST | 6630 | 2295 + | 2295 + | 765 + | 765 + | 255 + | 255 | 37 OPENS | 34 OPENS | 31 OPENS |
| SECOND | 6375 | 2295 + | 2295 + | 765 + | 765 + | 255 | --- | 38 OPENS | 34 REMAINS OPEN | 31 REMAINS OPEN |
| THIRD | 6120 | 2295 + | 2295 + | 765 + | 765 | --- | --- | 39 OPENS | 34 REMAINS OPEN | 31 REMAINS OPEN |
| FOURTH | 5865 | 2295 + | 2295 + | 765 | --- + | 255 + | 255 | 37 OPENS | 35 OPENS | 31 REMAINS OPEN |
| FIFTH | 5610 | 2295 + | 2295 + | 765 | --- + | 255 | --- | 38 OPENS | 35 REMAINS OPEN | 31 REMAINS OPEN |
| SIXTH | 5355 | 2295 + | 2295 + | 765 | --- | --- | --- | 39 OPENS | 35 REMAINS OPEN | 31 REMAINS OPEN |
| SEVENTH | 5100 | 2295 + | 2295 | --- | --- + | 255 + | 255 | 37 OPENS | 36 OPENS | 31 REMAINS OPEN |
| EIGHTH | 4845 | 2295 + | 2295 | --- | --- + | 255 | --- | 38 OPENS | 36 REMAINS OPEN | 31 REMAINS OPEN |
| NINTH | 4590 | 2295 + | 2295 | --- | --- | --- | --- | 39 OPENS | 36 REMAINS OPEN | 31 REMAINS OPEN |
| TENTH | 4335 | 2295 | --- | + 765 + | 765 + | 255 + | 255 | 37 OPENS | 34 OPENS | 32 OPENS |
| ELEVENTH | 4080 | 2295 | --- | + 765 + | 765 + | 255 | --- | 38 OPENS | 34 REMAINS OPEN | 32 REMAINS OPEN |
| TWELFTH | 3825 | 2295 | --- | + 765 + | 765 | --- | --- | 39 OPENS | 34 REMAINS OPEN | 32 REMAINS OPEN |
| THIRTEENTH | 3570 | 2295 | --- | + 765 | --- + | 255 + | 255 | 37 OPENS | 35 OPENS | 32 REMAINS OPEN |
| FOURTEENTH | 3315 | 2295 | --- | + 765 | --- + | 255 | --- | 38 OPENS | 35 REMAINS OPEN | 32 REMAINS OPEN |
| FIFTEENTH | 3060 | 2295 | --- | + 765 | --- | --- | --- | 39 OPENS | 35 REMAINS OPEN | 32 REMAINS OPEN |
| SIXTEENTH | 2805 | 2295 | --- | --- | --- + | 255 + | 255 | 37 OPENS | 36 OPENS | 32 REMAINS OPEN |
| SEVENTEENTH | 2550 | 2295 | --- | --- | --- + | 255 | --- | 38 OPENS | 36 REMAINS OPEN | 32 REMAINS OPEN |
| EIGHTEENTH | 2295 | 2295 | --- | --- | --- | --- | --- | 39 OPENS | 36 REMAINS OPEN | 32 REMAINS OPEN |
| NINETEENTH | 2040 | --- | --- | 765 + | 765 + | 255 + | 255 | 37 OPENS | 34 OPENS | 33 OPENS |
| TWENTIETH | 1785 | --- | --- | 765 + | 765 + | 255 | --- | 38 OPENS | 34 REMAINS OPEN | 33 REMAINS OPEN |
| TWENTY-FIRST | 1530 | --- | --- | 765 + | 765 | --- | --- | 39 OPENS | 34 REMAINS OPEN | 33 REMAINS OPEN |
| TWENTY-SECOND | 1275 | --- | --- | 765 | --- + | 255 + | 255 | 37 OPENS | 35 OPENS | 33 REMAINS OPEN |
| TWENTY-THIRD | 1020 | --- | --- | 765 | --- + | 255 | --- | 38 OPENS | 35 REMAINS OPEN | 33 REMAINS OPEN |
| TWENTY-FOURTH | 765 | --- | --- | 765 | --- | --- | --- | 39 OPENS | 35 REMAINS OPEN | 33 REMAINS OPEN |
| TWENTY-FIFTH | 510 | --- | --- | --- | --- | 255 + | 255 | 37 OPENS | 36 OPENS | 33 REMAINS OPEN |
| TWENTY-SIXTH | 255 | --- | --- | --- | --- | 255 | --- | 38 OPENS | 36 REMAINS OPEN | 33 REMAINS OPEN |
| TWENTY-SEVENTH | 0 | --- | --- | --- | --- | --- | --- | 39 OPENS | 36 REMAINS OPEN | 33 REMAINS OPEN |

Fig 7

Inventor: William John Willis

INVENTOR.
WILLIAM JOHN WILLIS
BY Alden D. Redfield
Charles M. Hogan
ATTORNEYS.

MULTIPLEX COMMUNICATION SYSTEM WITH MULTILINE DIGITAL BUFFER

Filed May 7, 1962 7 Sheets-Sheet 6

INVENTOR.
WILLIAM JOHN WILLIS
BY Alden D. Redfield
Charles M. Hogan
ATTORNEYS.

March 1, 1966 W. J. WILLIS 3,238,298
MULTIPLEX COMMUNICATION SYSTEM WITH MULTILINE DIGITAL BUFFER
Filed May 7, 1962 7 Sheets-Sheet 7

INVENTOR.
WILLIAM JOHN WILLIS
BY Alden D. Redfield
Charles M. Hogan.
ATTORNEYS.

3,238,298

MULTIPLEX COMMUNICATION SYSTEM WITH MULTILINE DIGITAL BUFFER

William John Willis, Reading, Ohio, assignor to Avco Corporation, Cincinnati, Ohio, a corporation of Delaware Filed May 7, 1962, Ser. No. 192,847
8 Claims. (Cl. 178—50)

The present invention relates to communications and data processing. More specifically, the invention provides a basically new system and method for transmitting, routing and handling a plurality of messages on a time-multiplex basis. The invention further provides a fundamentally novel multiline digital buffer.

Before discussing the objects of the invention, this specification will point out a few typical problems raised at message-handling and switching centers. Visualize a center having a great number of incoming information channels or message lines (originating at subscriber stations, for example) and also a large number of outgoing lines. Some of the latter may be communication lines, some may be connected to computers, others may be connected to display devices, storage devices, or additional switching or message-handling centers. The number of incoming data reception lines and outgoing data transmission lines may be on the order of 1000.

While the classic problem is to switch any one of the incoming lines into relation with any ordered one of the outgoing lines, and also to reverse the roles of some or all of the lines, that problem involves many complexities. For example, one or many of the outgoing lines may be "busy" when ordered, so that a desired line becomes available only on a delayed or "call back" basis. There may be requirements for deferred delivery of message on numerous lines. The incoming message may represent a variety of codes and frequencies. The lines are independently operated, and a large number of them may be in use or may be ordered into use at any one time. The center must be two-way or reciprocal in operation, capable of using the outgoing lines for reception and the incoming lines for transmission, and all of the operations herein discussed must be performed at extremely high speeds.

The requirement of concurrent operation of many lines has heretofore been considered by the art to require individual line equipments for storage and buffering, as well as highly complex electrical networks.

A primary object of the invention is to provide a novel method of transmitting data which involves these steps:

First, time-multiplex sampling by commutating a large plurality of information channels at a rapid repetitive rate;

Second, utilizing differential delay techniques to time-compress the samples into serial groups, each group containing only samples from an individual one of the information channels and the successive groups relating to any one channel being spaced in time by groups relating to the other channels;

Third, delivering in parallel form, or rendering available for outgoing transmission or storage or further processing, the information from all of the lines, each item of information being "compartmented" according to line of origin.

Another principal object of the invention is to provide a center such that a single serial-parallel converter or equivalent is utilized successively to process the sample groups in sequence. That is to say, a single serial-parallel converter or equivalent processes data from a plurality of lines.

It will be observed that the converter "works on" a group of samples from a given first line, then on a group of samples from another line, and so forth, finally returning to the first and repeating the sequence. Another object of the invention is to provide means whereby, when the converter interrupts work on a line and takes up another line, it stores data indicating the status of said one line and retrieves such data, to assure continuity, when processing of the first-mentioned line is resumed. The capacity of the storage device is such that, at any one time, it contains such data, as to all lines other than the one being "worked on."

An object of the invention, therefore, is to provide a converter with storage so proportioned and arranged as to handle data from a large number of information channels.

Among the advantages of the invention is the fact that single devices associated with the converter can monitor information from all of the channels and check errors.

Another primary object of the invention is to provide a novel method of reciprocally transmitting data which involves these three steps:

First: collecting data in parallel from a plurality of lines and converting it to serial presentation;

Second: degrouping said data into a sequence of samples;

Third: desampling, i.e., applying said samples sequentially to a plurality of lines to reconstruct information.

A further fundamental object of the invention is to provide a system in which essentially a single converter is time-shared to convert series groups of samples to parallel information on one hand, and reciprocally, to convert parallel information into series data.

For a better understanding of the invention, together with other further objects, advantages and capabilities thereof, reference is made to the following description of the accompanying drawings in which:

FIG. 7 is a chart explanatory of the sequence of operations of the FIG. 6 gates when performing compression by differential delay;

In the following description, teletype signals are chosen for purposes of illustration, but it will be understood that this illustration is not intended to constitute a limitation on the wide and general utility of the invention. Additionally, the parameters herein mentioned are intended to be illustrative and are not presented by way of limitation.

Figure 1:
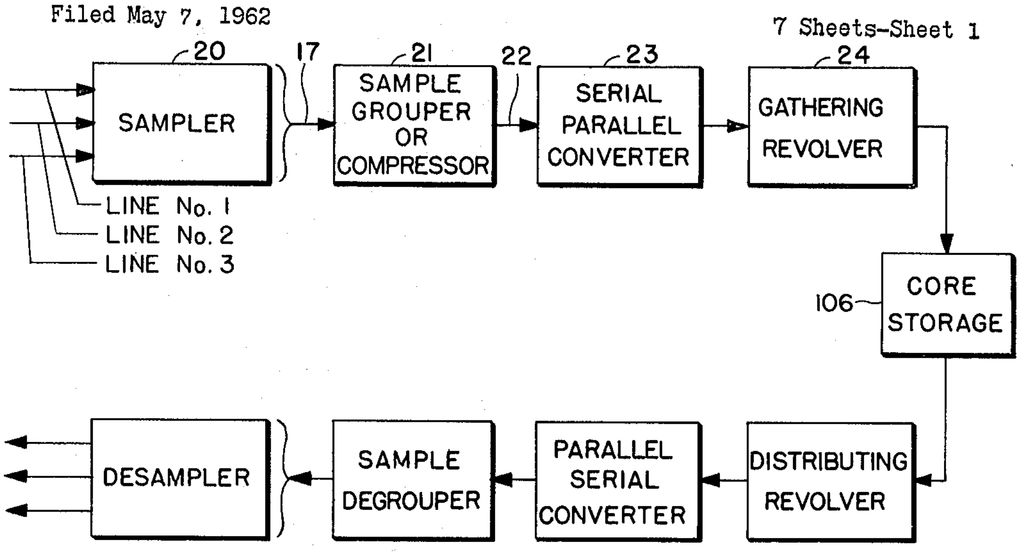
FIG. 1 is, in block diagram, a schematic of a preferred form of multiline digital buffer in accordance with the invention.
Figure 2:
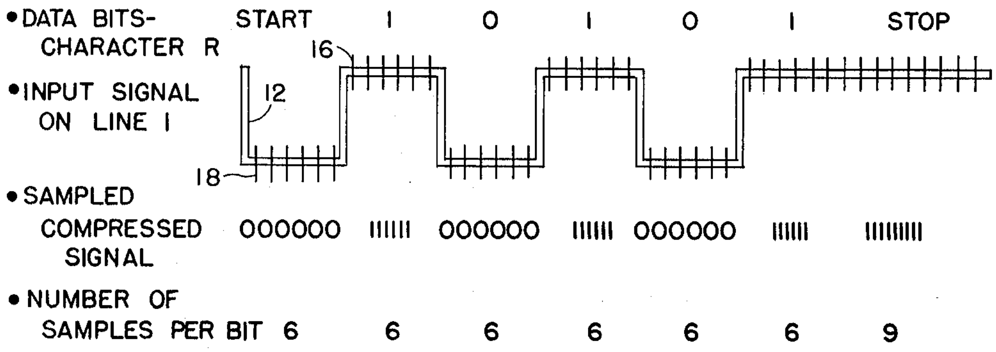
FIG. 2 is a graph of a standard teletype character, with legends used in explaining the operation of the invention as employed in communicating teletype information.

Referring now specifically to FIG. 2, there are shown the electrical levels of a standard teletype character, such as the letter "R." The input on any or all incoming lines (FIG. 1) may comprise a series of such characters when teletype messages are being handled. The teletype character is bivalued, with 60 milliamperes of current representing the "mark" condition (i.e., binary one) and zero current the "space" condition (i.e., binary zero). A teletype character consists of several time divisions, called bauds or bits. A character always starts with a "space," or start baud or bit, that is, an instantaneous drop to zero value followed by a binary zero condition (as shown at 18, FIG. 2). The start bit is followed by five information bauds, any one of which may be either of binary one or binary zero level and all of which are of equal duration. For "R" the five information bauds, in sequence, are in the code 10101. The information bits are followed by a stop baud or mark. The stop bit is at the binary one level and is of longer duration than any of the information bits. Let it be assumed for purposes of this discussion that a serial teletype input is present on each of lines 3, 2, and 1 of FIGS. 1 and 3.

In standard teletype practice the customary rate of transmission is 10 characters per second or 100 words per minute, six characters being deemed a word. Each character comprises 7.5 data bits or bauds (inclusive of start and stop), so that the duration of each data bit (for example, bit 16, FIG. 2) approximates 13,333 microseconds. The duration of each character is 100,000 microseconds. This rate of data transmission is so slow that a multiplicity of equipments has heretofore been required for handling of a multiplicity of lines.

The first steps in the novel method of transmission herein taught are sampling and time-division multiplexing. The input lines Nos. 1, 2, 3 are commutated into a single line 17 at a rate which is determined in the manner now described.

Let S be the number of samples required or established for complete definition or determination of each character of the signal on any line (Tou, "Digital and Sampled-Data Control Systems," pp. 80, et seq., McGraw-Hill Book Company, New York, 1959). The transmission duration of each sample is extremely short in comparison to the sampling period T, which in this case is the duration of one bit such as 16 (FIG. 2). The aggregate duration of all of the samples for any bit is small compared to the duration of the bit. It will be seen, therefore, that a process of sampling the digital-coded teletype characters renders the time-consumption required for the transmission of information capable of a large order of compression.

Let N be the number of incoming lines. Then the sampling rate is equal to $S \times N \times C$ samples per second, where C is the number of characters per second.

By reference to FIG. 2, it will be seen that the information in the character R is, for purposes of illustration, defined by six samples, such as 18, for the start bit, six samples for each of the information bits, and nine for the stop bit. FIG. 2 is provided simply for purposes of explanation, to illustrate the principle that a digitally encoded character can be defined in terms of samples of relatively short duration, whereby the transmission time consumed by signal information is greatly comprised. In practice a larger-order constant sampling rate, such as one hundred and eighty samples per character, is used. Such practice would establish a sampling rate of $180 \times 256 \times 10$ per second, for 256 incoming lines. If it be assumed that there were 256 incoming lines in FIG. 3, this means that the arm 19 would rotate at 1800 revolutions per second, for a sampling rate of 460,800 samples per second.

Figure 3:
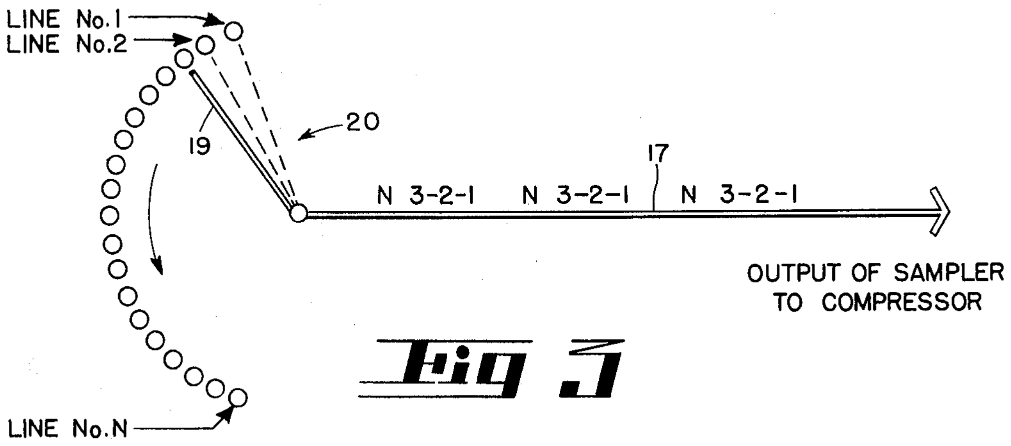
FIG. 3 shows, in skeleton form, a suitable commutator or distributing device employed in the sampling or desampling portion of the FIG. 1 system.

Referring now specifically to FIG. 3, there is shown a sampling or commutating device. It comprises a rotary arm 19 connected to line 17, and a plurality of input lines designated by the legends No. 1, No. 2, No. 3, etc., up to and inclusive of line No. N, the letter "N" indicating the number of the last line in the plurality of input lines. Each of these input lines terminates at an individual fixed contact. A line 17 is connected to such rotary contact arm to provide a single high-speed channel. Assuming a counter-clockwise direction of rotation of arm 19, it will be understood that the sequence of samples appearing on line 17 is as follows: first a sample from line No. 1, next a sample from line No. 2, and so forth. Thus it will be seen that the first step in the invention is to sample the incoming lines sequentially to provide one sample from each, in a series. It will be understood that the arm 19 or equivalent is included within the sampling device designated by the reference numeral 20 in FIGS. 1 and 5. Since the sampling is a repetitive process, the just mentioned series of samples is followed by another series in accordance with the same sequence, and so forth, there being 1800 series in all, per second, under the hypothetical numerical conditions assumed.

It should be noted at this point that the sampling process is not synchronized with any of the signals on the input lines, and the sampling rate is asynchronous so far as they are concerned. Further, the rigid time-positional relationship between the instant of start, designated at 12 in FIG. 2, and the first sample, such as 16, pertinent to the character, is assumed only for purposes of discussion in FIG. 2 and is not in fact present. That is to say, the taking of samples is timed by a constant-rate clock and is independent of the incoming data. Bias and distortion on the incoming line may cause more or less samples to be taken of each data bit, but a counting process discussed hereinbelow assures accurate sampling. The sampler 20, as has been indicated, samples all of the lines and puts the samples on the same high-speed data highway 17, in the form of time-division multiplex.

While the sampler illustrated in FIG. 3 is symbolically shown as a sample commutator switch, it will be understood that other well-known proper techniques in the art would in practice be used for the purpose, such as a counter and diode gating, but functionally the sampler boils down to a commutating switch and is shown as such.

The technique of repetitively successively sampling several messages greatly reduces the time of reception per message, by a substantial multiple, but this is only one of a combination of principles exploited in the present invention.

Let there now be considered the high-speed highway or channel 17. There will appear on that line a sample from line No. 1, followed by a sample from line No. 2 . . . , and finally a sample from line No. N. This sequence of samples is followed by a like sequence, and 1800 of these sequences occur per second with the parameters assumed. All of these sequences taken together provide, in serial formation, the same aggregate amount of information as would be provided by ten characters on each line. Now, recalling that the assumed duration of each original character, such as the letter R, is 100,000 microseconds, so that the duration of ten characters would be one second, what is provided here, by way of illustration, is an increased rate of transmission on the order of 256—i.e., N. The system is by no means limited to this particular parameter, as will be understood from the description which follows.

It will be understood that each sample in channel 17 will have either a binary one level or a binary zero level, dependent on the incoming data bit or other level of the signal being sampled.

Figure 5:
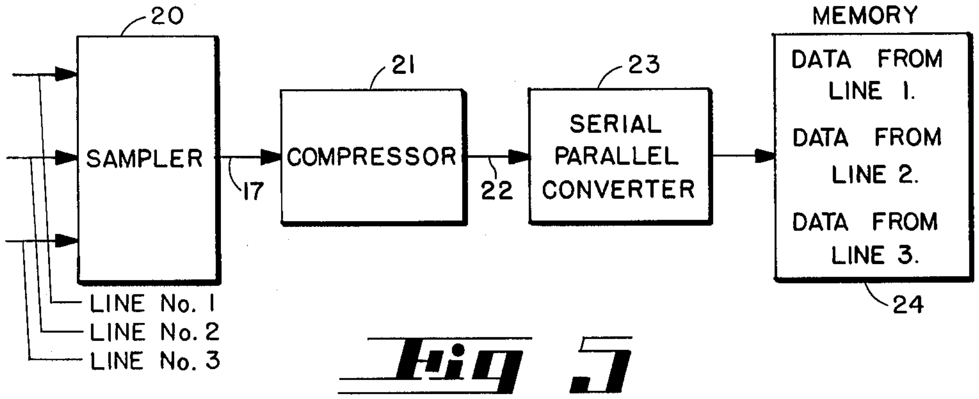
FIG. 5 is a schematic, in block form, of what is described as the transmitting portion of the FIG. 1 system.

Returning now to a consideration of FIG. 2, it will be understood that any bit or part of a character may be reconstructed by grouping together the samples representative of that bit or fragment. For example, returning now to the illustrative sequence used in FIG. 2: the first six samples, at binary zero level, can, when grouped together, signify a start bit; the next six samples can, at binary one level, signify a binary one bit; the following six samples can signify a bit at binary zero level. That is to say, any fragment of the original teletype signal may be reconstructed in effect by grouping together a substantial number of samples, serially. This function is performed by the grouper 21 (FIGS. 1 and 5). Additionally, successive fragments of a character originating from the same incoming line are put into sequence by the converter 23. The converter 23 is time-shared and operates successively on groups of samples from the respective lines. Further, the gathering revolver 24 places in sequence the characters from each line constituting the message from that line.

The present invention is based in part on an appreciation that, by rearranging the samples appearing on line 17 in groups, the entire binary coded signal can be reconstructed, line for line. For example, if the character R be assumed to be on incoming line No. 1, the information in that character is fully set forth by a sequence of samples as follows (FIG. 2): six samples at binary zero level, six at binary one level, six at binary zero level, six at binary one level, six at binary zero level, six at binary one level, concluded by nine samples at binary one level. Armed with a group of samples from any one incoming line, the orginal signal may be entirely reconstructed.

The discussion pertinent to FIG. 2 postulates forty-five samples per character; however, it has already been stated that a sampling rate of one hundred and eighty per character is preferred in practice.

Figure 4:
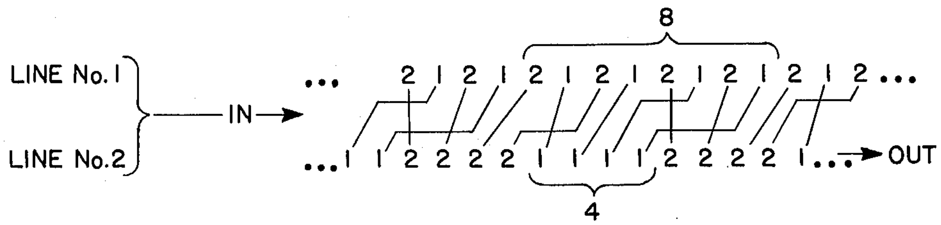
FIG. 4 is a chart used in explaining the principles of differential delay exploited in the compressor used in the FIG. 1, 5 system.

Now then, the function performed by the grouper 21 is to place together or group, with major time compression, a substantial number of samples from line No. 1 (say twenty-seven samples), then to place together a large number of samples (say twenty-seven) from another line (say line No. 28), and to repeat this process, for any one cycle until groups of samples from all of the lines are produced, in sequence. Now, in approaching the principle here involved, it will be assumed for purposes of discussion that the compressor 21 is working in a system in which there are only two input lines, No. 1 and No. 2, so that on line 17 there successively appear samples (disregarding their level for the moment) in this sequence, by lines: 2, 1, 2, 1, 2, 1, 2, 1, 2, 1, 2, etc. This sequence is illustrated by the upper line in FIG. 4. Now, in this example the number of lines N is equal to two. Now let there be delayed the first sample from line No. 2, by a time equal to three times the time interval between samples—i.e., by $3(N-1)$ multiplied by this time interval. Let there be delayed the second sample from line No. 2 by an amount equal to two times that interval—i.e., by $2(N-1)$, to express this in abbreviated language leaving interval to be understood. Let the third sample from line No. 2 be delayed by one interval—i.e., N. Let the fourth sample be undelayed. This process is referred to as "differential delay time compression" of the samples, and the particular illustration in FIG. 4 shows how a sequence of samples from two incoming lines can be transformed into groups of four samples each. It will be observed that on the outcoming line 22 of compressor 21 there now appears a group of four samples from line No. 2, followed by a group of four samples from line No. 1, the latter being followed by a group of four samples from line No. 2, and so forth. It should be noted that this represents a partial reconstruction of an original teletype character. Moreover, an extension of this principle by the grouping together of a larger number of samples permits more of the teletype character to be reconstructed. Assuming various fragments of the teletype signal to be reconstructed, placing of those fragments in sequence enables entire characters to be reconstructed. The latter is the function performed by the serial-parallel converter 23.

Figure 6:
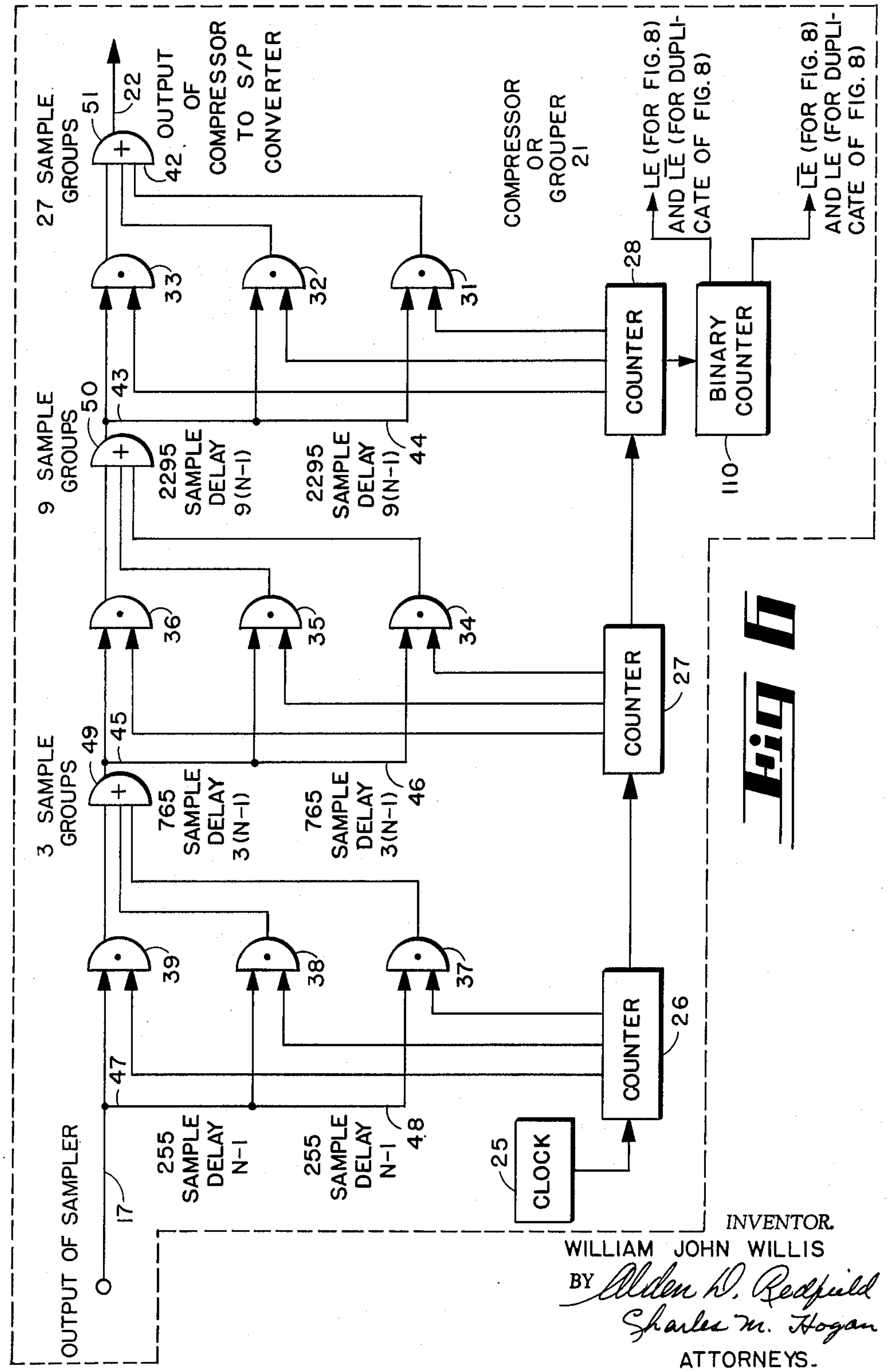
FIG. 6 is a block diagram of the logic or gating network employed in a compressor or degrouper in accordance with the invention.

Note that information from line No. 1 which occurred over a period of eight "sample times" at the input of the compressor or grouper 21 now occurs over a period of four "sample times." This is the reason why this grouping of samples is called "time compression." The exact amount of delay employed for each sample is easily controlled by simple counters and logic gating, for example (FIG. 6).

Having explained the principle of differential delay time compression, I now make specific reference to FIG. 6, which illustrates one form of compressor or grouper in accordance with the invention. In explaining the simplified FIG. 4, it was observed that the first sample from line No. 2 was delayed by $3(N-1)$. The second sample from line No. 2 was delayed by $2(N-1)$. The highest Arabic numerical prefix designated the number of samples per group minus one. Now in FIG. 6 a twenty-seven sample group is desired. Therefore the FIG. 6 system comprises a clock 25, counters 26, 27, and 28, and a plurality of "and" and "or" gates so related that a $26(N-1)$ delay is imposed on the first received sample from line No. 1, for example, a $25(N-1)$ delay is imposed on the next sample from line No. 1, and so on, no delay being imposed on the twenty-seventh sample.

The FIG. 6 embodiment is a three-stage compressor having an "or" gate output 49 for the first stage, an "or" gate output 50 for the second stage, and an "or" gate output 51 for the third stage. Each stage comprises two delay lines, three "and" gates, an "or" gate, and a counter. The first stage groups the samples by threes. The second stage further groups the output of the first stage, and the output of the second stage comprises groups of nine samples. Extending the principle, the output of the third stage comprises groups of twenty-seven samples.

Considering now the first stage, it comprises the input line 17 and two delay lines 48 and 47, together with the "and" gates 37, 38, and 39 and the output "or" gate 49. The "and" gate circuits (one including 48 and 47, and the other 47 only) are effectively in parallel between input line 17 and the output "or" gate 49. The three "and" gates are individually coupled to counter 26, so that the counter controls the opening and closing of the gates.

Similarly, the second stage comprises the output of "or" gate 49, two delay lines 46 and 45, together with the "and" gates 34, 35, and 36 and the output "or" gate 50. The "and" gate circuits are effectively in parallel between gates 49 and 50, one circuit including delay lines 46 and 45, and the other circuit including 45 only. The three gates 34, 35, and 36 are individually coupled to counter 27, so that the counter controls the opening and closing of the gates.

Now as to the third stage, it comprises the output of "or" gate 50, two delay lines 44 and 43, together with the "and" gates 31, 32, and 33 and the output "or" gate 51. The "and" gate circuits of 31, 32, and 33 are effectively in parallel between the output of gate 50 and the output "or" gate 51, one circuit including delay lines 44 and 43, and the other circuit including 43 only. The three "and" gates 31, 32, and 33 are individually coupled to counter 28, so that the counter controls the opening and closing of the last-mentioned gates.

The master clock 25 controls the counters, and it is interlocked with the counters 26, 27, and 28, the operating rate of counter 28 being one-third that of counter 27, and the operating rate of counter 27 being one-third that of counter 26. During any particular grouping of twenty-seven samples, counter 26 makes twenty-seven counts, while counter 28 makes only three, for example, and counter 110 changes state once, at the end.

Perhaps the most simple way to understand the FIG. 6 system is to state a general law. There are imposed on the successive samples from any given source incrementally increasing delays according to the following formula: $(G-g)\cdot(N-1)\cdot$(time between outgoing samples) where G is the number of samples per group, $g$ designates the reverse order of the incoming samples in any given group, and N represents the number of samples in each series. In this case the number of lines is equal to 256. Therefore $(N-1)$ is equal to 255. G, the number of samples in each group, is 27. Therefore expression G is equal to 27. In the case under discussion, $g$ is equal to 1, and therefore the expression $(G-g)$ is equal to 26. 26 multiplied by 255 is equal to 6630 sample times, the delay which is to be imposed on the first sample of the group of twenty-seven samples. Before the first sample is gated into the output line 22, it is delayed by the following delay lines, effectively in series: 47, 48, 45, 46, 43, and 44. This series arrangement of delay lines may be regarded as a series framework into which the various individual delay lines are inserted by the gates. For the processing of the first sample, all of the lines are in series to impose thereon a delay of 6630 sample times. On the other hand, for the twenty-seventh sample, none of the lines is in series, and the twenty-seventh sample passes from lines 17 to line 22. This is explained in the chart of FIG. 7, the first column of which refers to the sequence of samples. The second column graphically points up the "differential delay" aspect, indicating the sample times of delays severally applied to the samples from the first to the twenty-seventh. The next six columns designate which delay lines impose the required delay on the particular sample under discussion. The following three columns indicate the sequence of operation of the gates.

Let us consider, for example, the first, second, and third samples. The routing of the first sample is via these elements: 47, 48, 37, 49, 45, 46, 34, 50, 43, 44, 31, 51, 22. Gates 37, 34, and 31 open to pass the first sample through the three stages to "or" gate 51. Now as to the second sample, the routing is similar except that delay line 48 is not effective and gate 38 opens, gates 34 and 31 remaining open.

The delays of the various lines are as follows:

48, $(N-1)$ or 255 sample times
47, $(N-1)$ or 255 sample times
46, $3(N-1)$ or 765 sample times
45, $3(N-1)$ or 765 sample times
44, $9(N-1)$ or 2295 sample times
43, $9(N-1)$ or 2295 sample times
Maximum, $26(N-1)$ or 6630 sample times Twenty-seven counts of the clock 25 after the last-mentioned sample from line No. 1 (it being undelayed) is passed through gates 39, 49, 36, 50, 33, and 51, another undelayed sample will similarly be passed directly from input line 17 to output line 22 of the compressor. The last-mentioned sample is twenty-seven beats of clock 25 behind said last sample from line No. 1, and is therefore the last sample from line No. 28. Therefore the compressor first turns out a group of twenty-seven samples from line No. 1, then a group of twenty-seven samples from line No. 28, then a group of twenty-seven samples from line 55, and so on.

Another way of looking at this is to consider that the first undelayed sample passing gate 51 from line No. 1 is the last sample from line No. 1. The next sample to pass gate 51 will necessarily (see chart in FIG. 7) be a sample which is delayed 6630 sample times. It is therefore the first sample from line No. 28. Now the first 6630 samples intervening between the first sample from line No. 28 and the last sample from line No. 28 (produced by twenty-six revolutions of arm 19) are passing down the compressor delay lines at this time.

It will be understood by those skilled in the art that retiming flip-flops may be placed at the outputs of the three compressor stages. While these introduce minor additional delays into the system, the provision for such delays does not affect the principles herein involved. Additionally, the providing of retiming flip-flops wherever required is well within the skill of the art.

While in the preferred embodiment the requisite differential delay is accomplished by delay lines, which also function as storage devices, it will be understood that the essential functions of delay and storage may be performed by other means, and therefore the block 21 in FIG. 1 is intended to be construed sufficiently broadly to include any appropriate means for performing the requisite primary functions just mentioned.

Essentially the compressor is a controlled delay line storage device with provisions for imposing on the successive samples from any given line delays according to the following formula:

$$(G-g)\cdot(N-1)$$

where G is the number of samples per group, $g$ designates the order of the sample in any given group (whether first, second, third, etc.), and N represents the number of incoming lines. Applying this formula to the first sample from any given line, for example, the delay is equal to $(27-1)\cdot(256-1)$, or 6630 sample times.

Now, the sequence of sample groups from the compressor 21 is applied to a single high-speed data converter 23, which is operated in a time-shared mode. Essentially what unit 23 does, in a typical cycle of operation, is to process the group of twenty-seven samples from line No. 1, then the first group from line No. 28, then the first group from line No. 55, and so on through the first groups from all lines and finally returning to the second group from line No. 1. When the information from successive groups from line No. 1 indicates the presence of a bit, the device 23 registers that bit. When the information from the successive groups from line No. 1 indicates the presence of a sufficient number of bits to constitute a character, then the device 23 delivers that character into a gathering revolver 24, in a sector thereof dedicated to the incoming line from which the character originates. The status of the series-parallel converter 23 at the conclusion of operations relating to a group from any particular incoming line consists of these factors: (1) a decision as to whether or not a start bit has been received on that line; (2) any data bits present; (3) the number of samples of coverage of the next data bit.

Now, it has been demonstrated that the compressor produces a sequence of groups of samples in series form—i.e., a group of twenty-seven samples from line No. 1, followed by a group of twenty-seven samples from line No. 28, followed by a group of twenty-seven samples from line No. 55, and so forth. Note that the information from the lines is reconstructed in part—that is, enough for a bit, or a fraction of a character, from each line. The converter, therefore: (1) converts, or conditions the first group of samples from line No. 1 for conversion, to parallel form; (2) operating in a time-shared mode, puts the status of line No. 1 information in memory and repeats the conditioning or conversion process with respect to the first group of samples from line No. 28; (3) places the status of line No. 28 information in memory; (4) similarly operates in sequence on the sample groups from all of the lines; (5) then retrieves from memory the status of the line No. 1 information and resumes operations with continuity on the second group of samples from line No. 1.

Stated in another way, the groups of samples are serially conveyed to a single high-speed data converter. This converter converts the first group of samples from line No. 1 into parallel form. Should any "left-over" unconverted information remain in the converter at the time that it completes processing the first group of samples from line No. 1, this unconverted information is stored in an auxiliary memory and retrieved when the converter acts upon the second group of samples from that same line. That is to say, the converter "looks at" a group of samples from line No. 1 and works on those. Then it takes up a group of samples from line No. 28, and in doing so stores in auxiliary memory whatever status it had on the completion of operations on the first group from line No. 1. At the time that the converter begins to work on the second group from line No. 1, the status which characterized the converter when it completed its operations on the first group from line No. 1 is restored, thus assuring continuity in the conversion of line No. 1 information into parallel form. Since the converter operates in a time-shared mode, such continuity is assured with respect to information from all of the lines.

Figure 11:
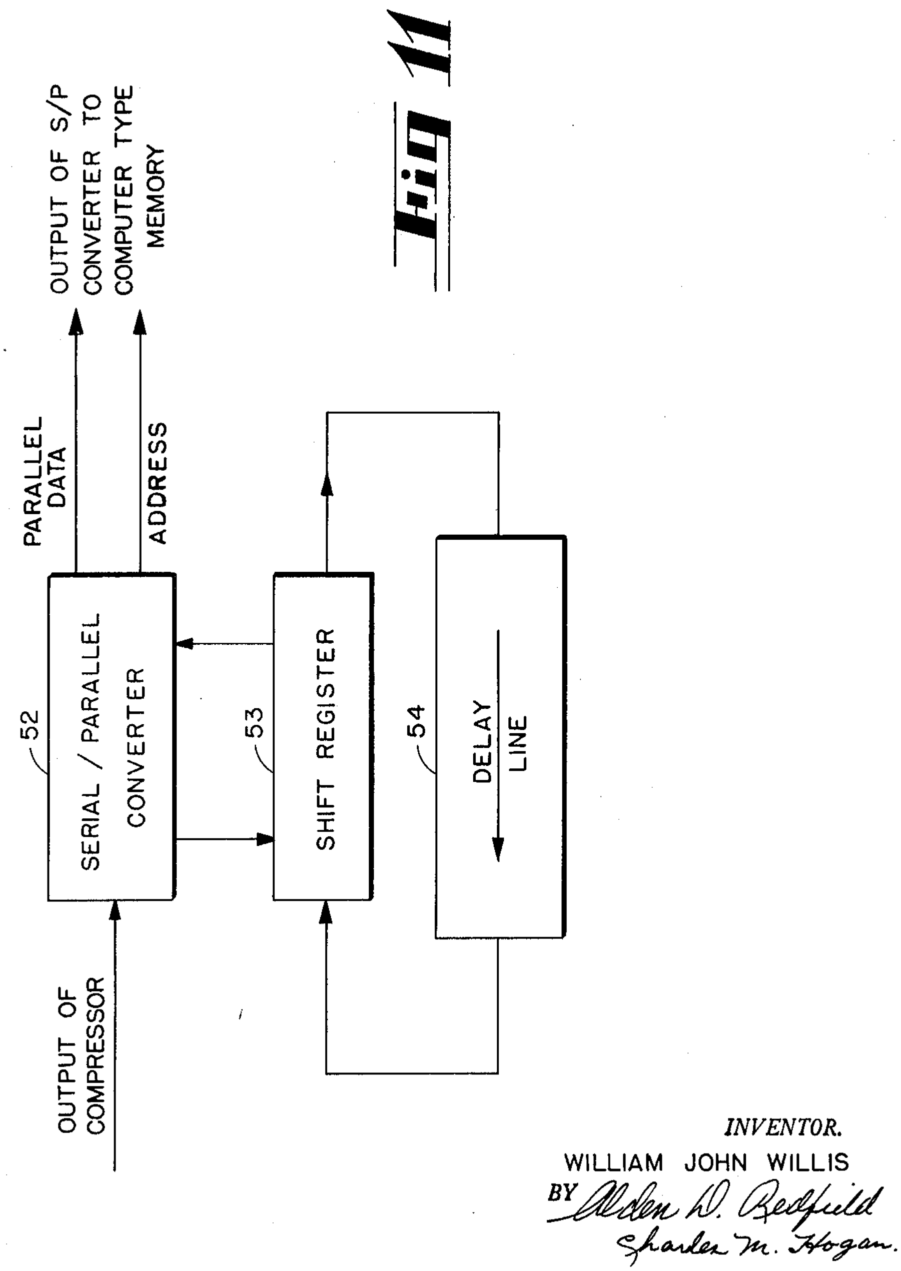
FIG. 11 is a block diagram of an alternative form of converter for use with the invention.

Reference is now made to FIG. 11 for a block diagram illustrating, in principle, what this single serial-parallel converter is. It will be understood that the block 23 of FIG. 1 contains the FIG. 11 elements. The output of the compressor is applied to a serial-to-parallel converter device designated in FIG. 11 by the reference numeral 52.

The groups of samples from all of the lines flow into the single serial-parallel converter 52. The serial-parallel converter has both digital input (samples) and digital output (words or characters) and hence is purely digital itself. The converter is composed of a number of flip-flops and some logical gating. The status of the converter can be stored away and later recalled by storing away and later recalling the state of the individual flip-flops.

Each time the converter finishes processing one line and starts to process another line, it must store away the status of the former line, and retrieve the status of the latter. The status of the line includes information on how many bits of data have been received, what these bits are (ones or zeros), and how many samples of the next data bit have been counted. In addition, the status may include one or two characters which have been saved up toward making a word, an address in which the next character or word ought to be put away, and information about error checking and description. If this information is put away after finishing with line No. 1, and is retrieved resuming line No. 1, the continuity is as if the converter were working on line No. 1 alone, even though actually the converter is working on 255 other lines.

In order to make a rapid transition from line to line, the data about the next line to be processed is retrieved serially into a shift register 53, ready for a parallel exchange of data with the converter flip-flops. Old information is put away from the shift register while new data is being taken in. Alternatively, two serial-to-parallel converters may be used.

The essential fact about the serial-parallel converter is that one converter, with delay line storage or equivalent, can handle data from many incoming lines.

The device 52 is operated on a multiplex or time-shared basis, in that it successively processes groups of data from line No. 1, line No. 28, etc. Unit 52 has an input to the shift register 53. The operation of the converter 52 and shift register 53, in conjunction, is illustrated on the supposition that the first group of samples from line No. 1 indicates the presence of a start bit and, say, three samples of a one bit. That is the status of the shift register when work on that first group has ceased. When the converter and shift register take up work on line No. 28, information indicative of such status is placed by the shift register into an auxiliary memory or delay line 54. Now, when the converter 52 resumes operation on the line No. 1 information and initiates conversion work on the second group of samples, this work is prefaced by an operation of the shift register 53 which retrieves such status from the delay line and re-inserts it into the converter, so that the converter resumes operations on information from line No. 1 with the same status that it had when it ceased previous operations on information from line No. 1.

Figure 8:
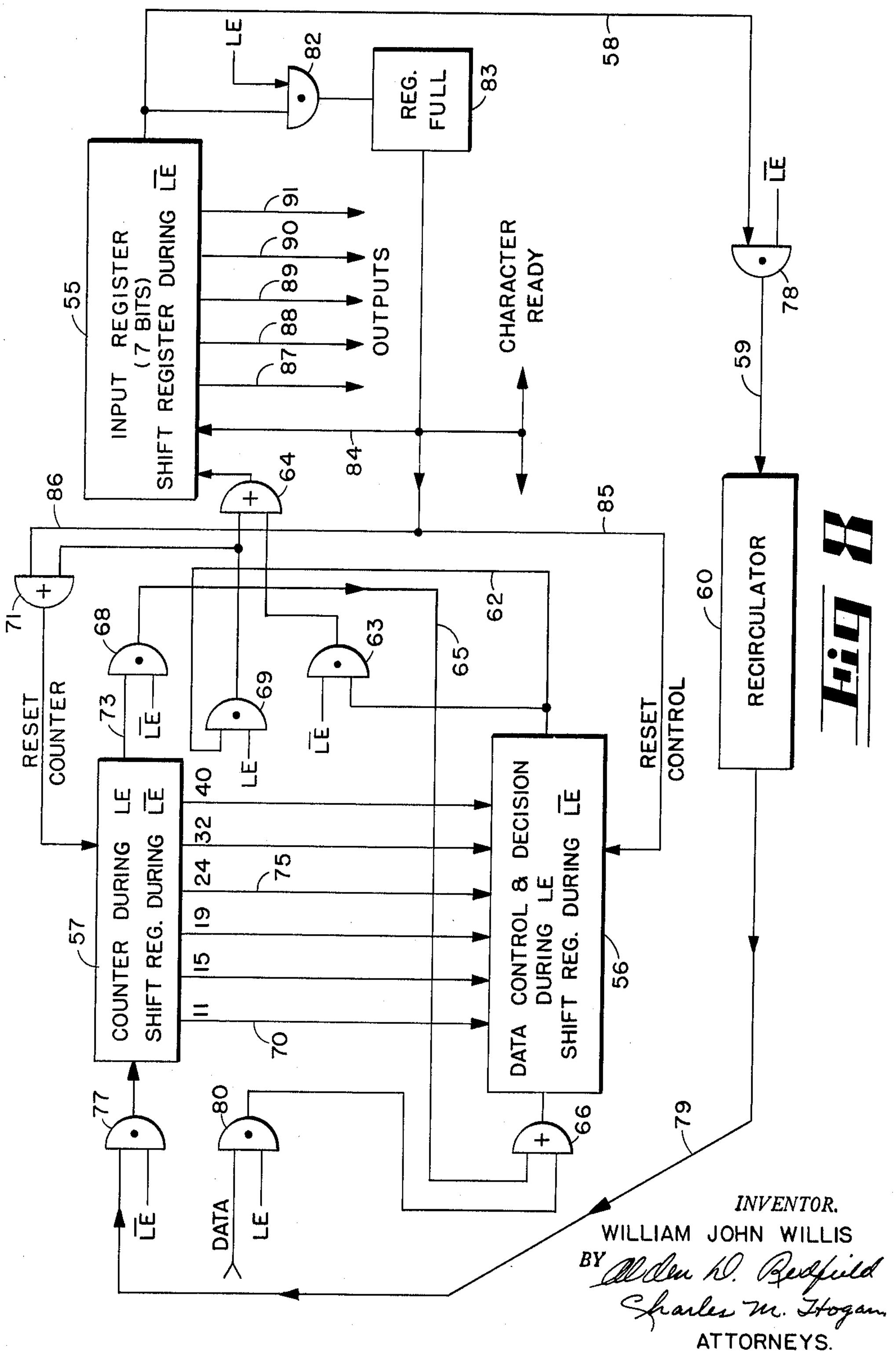
FIG. 8 is a schematic, in block form, of a converter in accordance with the invention.

The FIG. 11 embodiment illustrates the principles employed in the series-parallel conversion of data in the practice of the present invention. FIG. 8 illustrates a modified form of serial-to-parallel converter, for a 128 line system. It will be understood that two FIG. 8 devices, operating alternately, comprise the content of the block 23 in FIGS. 1 and 5, for a 256 line system. One of the FIG. 8 devices processes the group of data from lines Nos. 1 and 55, for example, and the other FIG. 8 device processes the groups of data from lines Nos. 28, 82, and so forth, the point being that, while one FIG. 8 device is operating as a data converter on a group, the other FIG. 8 device is operating as a shift register. The roles of the two devices are reversed following the processing of each twenty-seven sample group, so that the one device operates as a shift register and said other device as converter.

The most easily understood approach to the FIG. 8 device is first to consider its operation as a shift register. The device comprises a plurality of units 55, 56, and 57. Let it be assumed that these three devices have just completed conversion processing operations with respect to a group of samples from line No. 1. The next group to be processed by this device is a group from line No. 55. Before processing the group from line No. 55, however, the three units 55, 56, and 57 function as shift registers, in series, and store away their status in a delay line 60, to the end that such status may be retrieved at the time that conversion processing of the second group from line No. 1 is undertaken.

The discussion proceeds with the storing away of this status—i.e., the functioning of units 55, 56, and 57 as shift registers in series. Now, the status consists of several factors; first, the data bits in the input register 55. The input register has a capacity of seven bits, which, for example, can be the start bit and one or more of the data bits of the standard teletype character. This register 55 is coupled by line 58 and "and" gate 78 to a recirculating delay line 60. During what is referred to as the "line enable bar condition" the register 55 shifts seven bits (indicative of the states of the bistable units in 55) through gate 78 into the delay line 60. The status further consists of three items of information provided by the data control and decision unit 56: (1) an indication as to whether or not the start of a character has been recognized; (2) an indication as to which bit of a character was being worked on at the time that converting operations on a sample group ended; and (3) an indication of the level of the last bit worked on.

The latter three items of information are afforded by five bits of status information registered in unit 56. During the line enable bar condition these five bits are shifted through unit 55 and gate 78 into the delay line 60. Register 56 is coupled via line 62, "and" gate 63, and "or" gate 64 in series with register 55.

The final item included in the status, extensively discussed above, is an indication of how many samples of the last bit being worked on have been processed. This indication is furnished by six bits of data information from unit 57. During the line enable bar condition these six bits of status information are shifted from unit 57 through "and" gate 68, line 65, "or" gate 66, unit 56, line 62, "and" gate 63, and "or" gate 64 through the shift register 55 and thence into the delay line 60.

Parenthetically, the unit 57 functions as a counter during the line enable condition. Let us assume a sudden transition in the input signals from binary one level to binary zero level, as applied to unit 56. Now, the unit 57 then makes up to eleven counts, and, if on the eleventh count the level of the received signals is still at binary zero, the unit 56 will decide, or recognize, that a start bit has been received. The eleventh count is communicated by unit 57 to unit 56 via line 70, whereupon unit 56, acting via line 62 and "or" gate 71, resets the counter. Now, as additional samples are received, the counter resumes its count. Note that the recognition that a start bit has been received occurs approximately in the middle of the succession of samples constituting that bit. A count of twenty-four beyond that point would carry into the middle of the next bit. A count of twenty-four corresponds approximately to the number of samples between the middle of one bit and the middle of the next. However, under the conditions assumed, a start bit having been registered on the eleventh count, the counter will attain a count of only sixteen after it is reset. Note that under this set of facts, the FIG. 8 device is processing the first information bit of a teletype signal and has reached a point substantially short of the middle of that bit. When processing of a group of samples from line No. 1 is resumed, then the status of the counter is restored and it begins counting at sixteen, just where it left off during the previous counting, therefore assuring continuity.

From the foregoing it will be seen that the counter 57, at the end of the processing of each group, has achieved a status which it places in the delay line, via six bits of status information, along the following path: line 73, "and" gate 68, line 65, "or" gate 66, unit 56, line 62, "and" gate 63, "or" gate 64, unit 55, and line 58, as previously stated.

Returning now to the relationship between units 57 and 56, the reception of a start baud was first postulated. Assuming some other baud were first received, the counter in unit 57 can achieve a count as high as twenty-four, and would provide on line 75, to unit 56, information indicative of a twenty-four count, from which the unit 56 can decide that one of the five information bauds has been received. Unit 56 receives an order from unit 57 on line 70 when a start baud is recognized, and on line 75 when an information or stop baud is recognized.

Unit 56 decides that a start bit has been received when two events occur: (1) a change of level from one to zero, then (2) a count of eleven. This of course is contingent upon a third factor, which is that unit 55 is empty and has reset units 56, 57, and 55. Whenever the unit 57 indicates that it has reached a count of twenty-four, unit 56 will recognize that it has an information bit which should be delivered to unit 55. Therefore unit 55 successively works on data from 128 lines, it dicates whether it has been working on a start bit or an information bit. Unit 57 indicates on what part of the bit the work was being done.

Considering the line enable bar operating conditions, what is shown in FIG. 8 is simply a series of shift registers 55, 56, and 57. During the line enable bar condition these registers, in series, simply shift eighteen status bits into the delay line 60. The seven bits from unit 55 indicate the status of register 55 data-wise with reference to the start bit, the stop bit, and any information bits coming in from line No. 1, for example. Recalling that unit 58 successively works on data from 128 lines, it will be understood that the delay line 60 always contains 127 groups of eighteen bits, one group for each of the 127 lines not being worked on.

The five bits from unit 56 are indicative of three items of information: (1) whether or not the start of a character has been recognized; (2) whether the start bit or some other bit has been worked on; and (3) the level of the bit which has been worked on.

The six bits from unit 57 indicate, in the event that an information bit or baud was being worked on (i.e., samples which make up such a baud), whether the sample was the first, second third, or fourth, etc., in the baud.

Clarifying the relationship between the units 57 and 56, the unit 56 makes a decision that a start bit has been received, on the basis of an abrupt decrease in input signal level from binary one to binary zero, followed by an eleven count, as indicated on line 70, during which the zero level is maintained. Once unit 56 makes a decision that a start bit has been received, it resets the counter and now "looks at" line 75 rather than line 70.

The terms "line enable bar" and "line enable" have herein been referred to. The expression "line enable" simply designates clock pulses applied to a plurality of gates in the system so that the units function respectively as follows: unit 56 as a data control and decision unit, unit 55 as an input register, and unit 57 as a counter. The term "line enable bar" designates alternate pulses which are applied to the system for the purpose of making units 55, 56, and 57 function as shift registers. During the line enable period, twenty-seven clock times along, these units process or convert serial data into parallel form, or at least partially convert said data. During the line enable bar period, again twenty-seven clock times long, only eighteen of which are required for the eighteen bits of shifted status information, the resultant work product of the processing of a sample group is shifted into delay line 60.

Line enable bar pulses are applied to "and" gates 77, 68, 63, and 78 for the purpose of passing shifted information into the units 57, 56, 55, and 60, respectively. It will be understood that, as bits are shifted into the delay line 60 from the series of registers, stored information is shifted from the delay line 60 into the registers, the shifting loop being closed by line 79 between delay line 60 and "and" gate 77.

Line enable pulses are applied to "and" gates 80 and 69 in the input circuitry of units 56 and 55, respectively, to permit the flow of signal input data—i.e., sample groups—and information derived therefrom into units 56 and 55, respectively.

Line enable pulses are also applied through "and" gate 82 to a register 83, which, when the presence of a full character is indicated, resets registers 55, 56, and 57, via lines 84, 85, and 86, respectively.

Register 55 delivers an output character in parallel on lines 87, 88, 89, 90, and 91. At the same time that unit 55 delivers a character, it of course resets the three units 55–57.

During line enable, unit 57 is reset each time that unit 56 delivers a bit to unit 55.

The four lines between units 57 and 56, in addition to lines 70 and 75, are available for teletype speeds other than the standard speed, and need not further be discussed herein.

Figure 9:
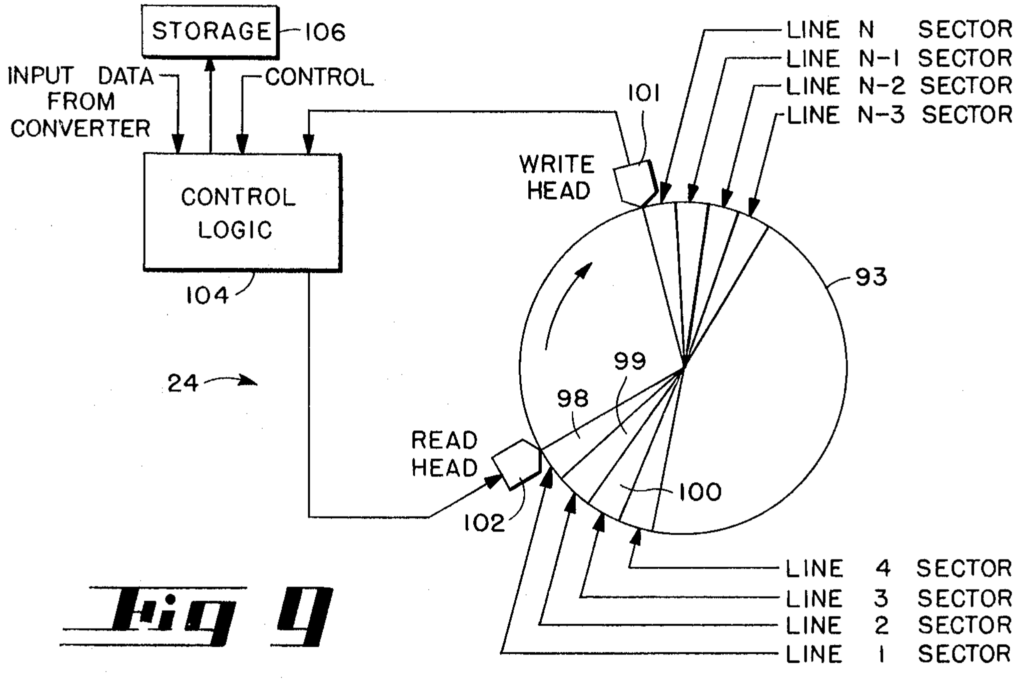
FIGS. 9 and 10 are, respectively, end view and frontal perspective views of one form of gathering revolver, or temporary storage device, suitable for incorporation in the system of FIGS. 1 and 5.

Lines 87–91 go on the write heads (FIG. 9).

In lieu of several delay line sections per stage (FIG. 6), I can also employ, up to full capacity, a single delay line section per stage and recirculate the samples through it according to the delay desired.

The contents of block 23 of FIG. 1 having been described in detail, and the means for delivery of received characters having been described, the discussion now proceeds to the memory or gathering revolver device 24.

Figure 10:
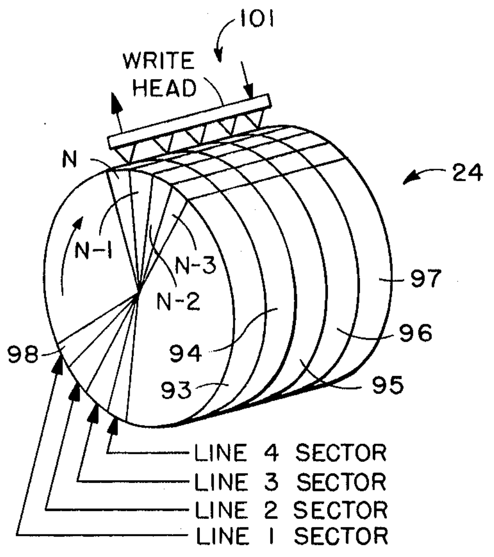

The grouping of samples and conversion into characters are synchronized with the gathering revolver so that a character from a given input line is presented to revolver only when the revolver can accept data from that line. The revolver is shown in outline form in FIGS. 9 and 10. It comprises a magnetic drum having five tracks 93, 94, 95, 96, and 97, each providing a "column," as it were, for one of the five information bauds. Each track is divided into sectors such as 98, 99, and 100, one sector pertaining to each incoming line. Five "write" heads and five "read" heads, indicated by the reference numerals 101 and 102, respectively, are further provided (the "read" heads not being shown in FIG. 10). The revolver is one character (five bauds) wide and 6912 characters long, each sector having a capacity of twenty-seven characters.

At this stage in the specification the parameters are restated, as follows:

| | |
|---|---|
| Transmission rate on each line | 100 words per minute, or 10 characters per second. |
| Number of bits per character | 7.5. |
| Number of samples per bit | 24. |
| Number of samples per character | 180. |
| Sampling rate | 460.8 kilocycles per second. |

The control logic device 104 associated with the gathering revolver times the rotation and angular position of the drum in such a way that the drum is appropriately positioned to write characters in the proper locations in the sections respectively corresponding to the incoming lines on which the characters originate. Additionally, the control logic device 104 characters originate. Additionally, the control logic device 104 causes each information baud to be written by the appropriate "write" head.

Revolvers are well known to those skilled in the art and are described in the literature, as in "Digital Computer Components and Circuits," Richards, D. Van Nostrand Co., Inc., New York, 1957, pages 296–297, and need not be described in further detail herein.

When any sector of the gathering revolver device is full, the contents may be dumped into permanent core storage, for example, as indicated by the reference numeral 106 in FIG. 1. Various types of quick-access storage methods and devices are well known to those versed in this art and need not be described further herein.

Referring again to FIG. 1, a system in accordance with the invention is operable in the reverse direction, data being withdrawn from the core storage device 106 (or from lines or some other source), fed by the revolver, which then functions as a distributing revolver, to a time-shared parallel-to-series converter, which converts the parallel data into groups of samples. These groups of samples are expanded in the sample degrouper, then applied to a desampler for distribution back to the lines Nos. 1 through 256. The samples may be utilized to set bistable devices in said lines to reconstruct the desired teletype signals. In other words, the revolver, serial-to-parallel converter, sample grouper, and sampler may be reversed as to function, which is the significance of the four blocks in the lower portion of FIG. 1.

Thus it will be seen that the invention provides, inter alia, apparatus for the rapid processing of information, comprising: First, a plurality of parallel incoming signal channels designated lines No. 1, No. 2 . . . N; and, second, time-multiplex means 20 for repetitively sampling all of said channels and serially routing their information on to a single high-speed channel 17, the information on said single channel comprising a succession of series of samples, each series being in the sequence of the lines sampled, one series for each repetition of the sampling. The invention further provides means 21 for grouping, according to incoming channels of origin, samples from a plurality of series by differentially delaying such samples to form time-compressed groups of samples. Each group originates from a particular line, and each group is followed by a group from another line. For example, it has been pointed out how the group from line No. 1 is followed by a group from line No. 28, and so forth. This example is intended to be purely illustrative and not limiting, of course. The invention further comprises time-shared means 23 for successively converting those groups of samples into separate parallel information messages. The word "message" is here used in such a sense as to indicate a character or any item of parallel form data.

While the invention comprises a subcombination which completes its function at the output of the serial-parallel converter—it being permissible to introduce the output of said converter directly into core storage, for example—the invention further embraces the combination inclusive of means, such as a gathering revolver 24 for buffer-storing the messages. Both the combination and the subcombination are of general utility.

Additionally, the invention embraces the novel grouper 21 as such and the novel serial-parallel converter as such, each of these devices having utility not only in the general combination and the subcombination mentioned above, but also in other environments.

It will be noted that the sampler 21 in accordance with the invention (as shown in FIG. 6) treats alike each group of 256 samples. It also treats every line alike. This is true because the number of incoming lines is prime to the number of samples per group.

While there has been shown and described what is at present considered to be the preferred embodiment of the present invention, it will be understood by those skilled in the art that various changes and modifications may be made therein without departing from the scope of the invention as defined in the appended claims.

Having fully described my invention, I claim:

1. The combination of:

means for cyclically producing on a single channel a succession of series of samples, each series being in a predetermined sequence, and means synchronized with the last-mentioned means for differentially delaying samples from a plurality of said series to form time-compressed groups of samples, the differential-delaying means comprising:

first, a delay storage device comprising a plurality of cascaded stages each consisting of an input and output and a plurality of delay line sections, and second, means for controlling the delay storage device to impose on the successive samples from any given source incrementally diminishing delays according to the following formula: $(G-g)\cdot(N-1)\cdot$(time between incoming samples), the last-mentioned means comprising "and" gates for inserting none, one or more of said delay line sections between said input and output, where G is the number of samples per group,

*g* designates the order of the incoming sample in any given group, and N represents the number of samples in each series.

2. Apparatus for the rapid processing of information, comprising, in combination:

first, a plurality of parallel incoming signal channels designated 1, 2 . . . N;

second, time-multiplexing means for repetitively sampling all of said channels and serially routing their information on to a single high-speed channel, the information on said single channel comprising a succession of series of samples, each series being in the sequence of the incoming channels sampled, one series for each repetition of the sampling;

third, means comprising several gated plural-line stages and synchronized wth the time-multiplexing means for differentially delaying samples from a plurality of said series to form time-compressed groups of samples, each group originating from a particular incoming channel but comprising as many subgroups as there are stages, and each group being followed by a group from another incoming channel; and fourth, time-shared means for successively processing said groups to deliver the message content of the several groups in parallel form and in a regular repetitive sequence, said time-shared means including a message content register and retrieving means for restoring the register to the status which characterized the conclusion of its processing of a group from any given channel preparatory to resumption of processing of the next succeeding group from the same channel.

3. Apparatus for the rapid processing of information, comprising, in combination:

first, a plurality of parallel incoming signal channels designated 1, 2 . . . N;

second, time-multiplexing means for repetitively sampling all of said channels and serially routing their information on to a single high-speed channel, the information on said single channel comprising a succession of series of samples, each series being in the sequence of the incoming channels sampled, one series for each repetition of the sampling;

third, means comprising several gated plural-line stages and synchronized with the time-multiplexing means for differentially delaying samples from a plurality of said series to form time-compressed groups of samples, each group originating from a particular incoming channel but comprising as many subgroups as there are stages, and each group being followed by a group from another incoming channel; and fourth, time-shared means for successively processing said groups to deliver the message content of the several groups in parallel form and in a regular repetitive sequence, the time-shared means comprising a pair of register systems each alternately operable in a storage register mode and in a shift register mode, the two register systems operating in unlike modes.

4. Apparatus in accordance with claim 3 in which each of said register systems comprises a message content register and a counter register and a control register, and a recirculating delay line together with means for encircuiting the three registers in series with each other and with the delay line when the operation is in the shift register mode, thereby to preserve for later application to the message content register the status of the register system which characterized the conclusion of its processing of a group from any given channel preparatory to resumption of processing of the next succeeding group from the same channel, so that the resultants of said processing may present compatible interfaces.

5. Apparatus for the rapid processing of information, comprising, in combination:

first, a plurality of parallel incoming signal channels designated 1, 2 . . . N;

second, time-multiplexing means for repetitively sampling all of said channels and serially routing their information on to a single high-speed channel, the information on said single channel comprising a succession of series of samples, each series being in the sequence of the incoming channels sampled, one series for each repetition of the sampling;

third, means comprising several gated plural-line stages and synchronized with the time-multiplexing means for differentially delaying samples from a plurality of said series to form time-compressed groups of samples, each group originating from a particular incoming channel but comprising as many subgroups as there are stages, and each group being followed by a group from another incoming channel;

fourth, time-shared means for successively processing said groups to deliver the message content of the several groups in parallel form and in a regular repetitive sequence, said time-shared means including a message content register and retrieving means for restoring the register to the status which characterized the conclusion of its processing of a group from any given channel preparatory to resumption of processing of the next succeeding group from the same channel; and fifth, means synchronized with said time-shared means for buffering and storing said messages.

6. Apparatus for the rapid processing of information, comprising, in combination:

means for converting separate information messages into groups of samples, each group originating from a particular message and each group being followed by a group from another message;

means comprising several gated plural-line stages and synchronized with the converting means for differentially delaying samples from said groups to form time-expanded samples in a single-channel succession of series, the samples in each series in said single channel being in the sequence of the outgoing signal channels to be demultiplexed;

and demultiplexing means synchronized with the differential-delay means for desampling said single channel and sequentially routing the information thereon to a plurality of outgoing signal channels, the demultiplexing being repeated for each series.

7. The combination of:

means for cyclically producing on a single channel a succession of series of samples, each series being in a predetermined sequence, and means synchronized with the last-mentioned means for differentially delaying samples from a plurality of said series to form time-compressed groups of samples, the differential-delaying means comprising:

first, a delay storage device comprising several gated plural-line stages, and second, means for controlling the delay storage device to impose on the successive samples from any given source incrementally diminishing delays according to the following formula: $(G-g)\cdot(N-1)\cdot$(time between incoming samples), where:

G is the number of samples per group,
g designates the order of the incoming sample in any given group, and
N represents the number of samples in each series.

8. The combination of:

means for producing an a single channel a succession of groups of samples, and means synchronized with the last-mentioned means for differentially delaying samples from said groups to form time-expanded samples in a single-channel succession of series, the differential-delaying means comprising:

first, a delay storage device comprising several gated plural-line stages, and second, means for controlling the delay storage device to impose on the successive samples from any given source incrementally increasing delays according to the following formula: $(G-g)\cdot(N-1)\cdot$(time between outgoing samples), where:

G is the number of samples per group,
g designates the reverse order of the incoming samples in any given group, and
N represents the number of samples in each series.

References Cited by the Examiner

UNITED STATES PATENTS

| | | | |
|---|---|---|---|
| 1,671,143 | 5/1928 | Campbell | 179—15 |
| 2,563,902 | 8/1951 | Yost | 328—94 |
| 2,875,336 | 2/1959 | Williams | 328—94 |
| 2,905,930 | 9/1959 | Golden | 340—172.5 |
| 2,951,905 | 9/1960 | Plouffe et al. | 179—15 |
| 2,951,906 | 9/1960 | Brown | 179—15 |
| 3,017,610 | 1/1962 | Auerbach et al. | 340—172.5 |

FOREIGN PATENTS

| | | |
|---|---|---|
| 814,158 | 5/1959 | Great Britain. |

DAVID G. REDINBAUGH, *Primary Examiner.*

MALCOLM A. MORRISON, *Examiner.*

P. L. BERGER, J. P. MOHN, S. J. GLASSMAN, *Assistant Examiners.*

UNITED STATES PATENT OFFICE
CERTIFICATE OF CORRECTION

Patent No. 3,238,298 March 1, 1966

William John Willis

It is hereby certified that error appears in the above numbered patent requiring correction and that the said Letters Patent should read as corrected below.

Column 3, line 65, for "comprised" read -- compressed --; column 9, line 34, before "resuming" insert -- before --; column 10, line 2, for "group" read -- groups --; line 11, before "converter" insert -- a --; column 11, line 38, for "unit 55 successively works on data from 128 lines, it" read -- unit 56, when it operates as a shift register, always in- --; line 50, for "58" read -- 55 --; same column 11, line 62, after "second" insert a comma; column 12, line 5, for "along" read -- long --; line 51, after "to" insert -- the --; column 13, line 5, for "sections" read -- sectors --; lines 7 and 8, strike out "Additionally, the control logic device 104 characters originate."; column 14, line 47, for "wth" read -- with --; column 16, line 31, for "an" read -- on --.

Signed and sealed this 24th day of January 1967.

(SEAL)
Attest:

ERNEST W. SWIDER
Attesting Officer

EDWARD J. BRENNER
Commissioner of Patents